United States Patent
Cingoz et al.

(10) Patent No.: US 10,824,047 B2
(45) Date of Patent: Nov. 3, 2020

(54) OPTICAL COMB CARRIER ENVELOPE-OFFSET FREQUENCY CONTROL USING INTENSITY MODULATION

(71) Applicant: AOSense, Inc., Sunnyvale, CA (US)

(72) Inventors: Arman Cingoz, Sunnyvale, CA (US); Dmitriy Churin, San Jose, CA (US); Jonathan Roslund, Mountain View, CA (US); Miao Zhu, San Jose, CA (US)

(73) Assignee: AOSense, Inc., Sunnyvale, CA (US)

( * ) Notice: Subject to any disclaimer, the term of this patent is extended or adjusted under 35 U.S.C. 154(b) by 0 days.

(21) Appl. No.: 15/457,929

(22) Filed: Mar. 13, 2017

(65) Prior Publication Data

US 2017/0264070 A1    Sep. 14, 2017

Related U.S. Application Data

(60) Provisional application No. 62/308,155, filed on Mar. 14, 2016.

(51) Int. Cl.
*G02F 1/35* (2006.01)
*H01S 3/13* (2006.01)
(Continued)

(52) U.S. Cl.
CPC ........... *G02F 1/353* (2013.01); *G02F 1/3501* (2013.01); *G02F 1/3544* (2013.01); *G02F 1/3551* (2013.01); *H01S 3/067* (2013.01); *H01S 3/0675* (2013.01); *H01S 3/06791* (2013.01); *H01S 3/0941* (2013.01); *H01S 3/106* (2013.01); *H01S 3/1106* (2013.01); *H01S 3/1112* (2013.01);
(Continued)

(58) Field of Classification Search
CPC ..... H01S 3/1307; G02F 2203/56; G02F 1/353
See application file for complete search history.

(56) References Cited

U.S. PATENT DOCUMENTS

| | | | |
|---|---|---|---|
| 5,745,284 A * | 4/1998 | Goldberg | G02F 1/37 359/328 |
| 8,743,919 B2 | 6/2014 | Telle | |

(Continued)

OTHER PUBLICATIONS

Benkler, et al., Endless Frequency Shifting of Optical Frequency Comb Lines, Optics Express, Mar. 11, 2013, 5793-5802, vol. 21, No. 5.

(Continued)

*Primary Examiner* — Omar R Rojas
(74) *Attorney, Agent, or Firm* — Van Pelt, Yi & James LLP

(57) ABSTRACT

A system for optical comb carrier envelope offset frequency control includes a mode-locked oscillator. The mode-locked oscillator produces an output beam using an input beam and one or more control signals. The output beam includes a controlled carrier envelope offset frequency. A beat note generator produces a beat note signal using a portion of the output beam. A control signal generator produces the one or more control signals to set the beat note signal by modulating the intensity of the input beam within the mode locked oscillator. Modulating the intensity comprises using a Mach-Zehnder intensity modulator or using an intensity modulated external laser to affect a gain medium within the mode-locked laser.

16 Claims, 11 Drawing Sheets

(51) Int. Cl.
*H01S 3/11* (2006.01)
*H01S 3/106* (2006.01)
*H01S 3/00* (2006.01)
*H01S 3/10* (2006.01)
*H01S 3/107* (2006.01)
*G02F 1/355* (2006.01)
*H01S 3/067* (2006.01)
*H01S 3/0941* (2006.01)
*H01S 3/16* (2006.01)

(52) U.S. Cl.
CPC .......... *H01S 3/1304* (2013.01); *H01S 3/1307* (2013.01); *H01S 3/1608* (2013.01); *H01S 3/1618* (2013.01); *G02F 2203/56* (2013.01); *H01S 3/0085* (2013.01); *H01S 3/107* (2013.01); *H01S 3/10092* (2013.01); *H01S 3/1118* (2013.01); *H01S 3/1305* (2013.01)

(56) References Cited

U.S. PATENT DOCUMENTS

| | | | |
|---|---|---|---|
| 8,971,358 | B2 | 3/2015 | Fermann |
| 8,976,823 | B2 | 3/2015 | Xu |
| 9,088,371 | B2 | 7/2015 | Witzens |
| 9,142,933 | B2 | 9/2015 | Brons |
| 9,653,868 | B2 | 5/2017 | Fermann |
| 9,680,287 | B2 * | 6/2017 | Schilt .................... H01S 3/1118 |
| 9,772,175 | B2 | 9/2017 | Black |
| 9,787,051 | B2 | 10/2017 | Fermann |
| 2002/0191285 | A1 | 12/2002 | Damask |
| 2008/0069491 | A1 | 3/2008 | Kissa |
| 2009/0092167 | A1 | 4/2009 | Stingl |
| 2009/0208200 | A1 | 8/2009 | Takasaka |
| 2011/0013262 | A1 | 1/2011 | Zadoyan |
| 2013/0003766 | A1 | 1/2013 | Savchenkov |
| 2013/0308663 | A1 | 11/2013 | Chen |
| 2013/0329279 | A1 | 12/2013 | Nati |
| 2014/0064734 | A1 | 3/2014 | Witzens |
| 2014/0185635 | A1 | 7/2014 | Cox |
| 2014/0205229 | A1 * | 7/2014 | Thaniyavarn ........... G02F 1/225 385/3 |
| 2015/0160532 | A1 | 6/2015 | Fermann |
| 2015/0333475 | A1 | 11/2015 | Blumenthal |
| 2015/0358086 | A1 | 12/2015 | Foster |
| 2016/0054639 | A1 | 2/2016 | Kono |

OTHER PUBLICATIONS

Buhrer et al., Optical Frequency Shifting by Electro-Optic Effect, Applied Physics Letters, Oct. 1 ,1962, 46-49, vol. 1, No. 2.

Holzwarth et al., Optical Frequency Synthesizer for Precision Spectroscopy, Physical Review Letters, Sep. 11, 2000, 2264-2267, vol. 85, No. 11.

Hudson et al., Mode-Locked Fiber Laser Frequency-Controlled with an Intracavity Electro-Optic Modulator, Optics Letters, Nov. 1, 2005, 2948-2950, vol. 30, No. 21.

Jones et al., Carrier-Envelope Phase Control of Femtosecond Mode-Locked Lasers and Direct Optical Frequency Synthesis, Science, Apr. 28, 2000, 635-639, vol. 288.

Karlen et al., Efficient Carrier-Envelope Offset Frequency Stabilization through Gain Modulation via Stimulated Emission, Optics Letters, Jan. 15, 2016, 376-379, vol. 41, No. 2.

Koke et al., Direct Frequency Comb Synthesis with Arbitrary Offset and Shot-Noise-Limited Phase Noise, Nature Photonics, Jul. 2010, 462-465, vol. 4, Macmillan Publishers Limited.

Lee et al., Frequency Comb Stabilization with Bandwidth Beyond the Limit of Gain Lifetime by an Intracavity Graphene Electro-Optic Modulator, Optics Letters, Aug. 1, 2012, 3084-3086, vol. 37, No. 15.

Sinclair et al., Operation of an Optically Coherent Frequency Comb Outside the Metrology Lab, Optics Express, Mar. 24, 2014, 6996-7006, vol. 22, No. 6.

Udem et al., Optical Frequency Metrology, Nature, Mar. 14, 2002, 233-237, vol. 416, Macmillan Magazines Ltd.

Zhang et al., Steering Optical Comb Frequency by Rotating Polarization State, https://arxiv.org/abs/1603.09500, Mar. 31, 2016.

* cited by examiner

OPTICAL COMB CARRIER ENVELOPE-OFFSET FREQUENCY CONTROL USING INTENSITY MODULATION

CROSS REFERENCE TO OTHER APPLICATIONS

This application claims priority to U.S. Provisional Patent Application No. 62/308,155 entitled HIGH BANDWIDTH ACTUATOR FOR FREQUENCY COMB CARRIER-ENVELOPE OFFSET CONTROL filed Mar. 14, 2016 which is incorporated herein by reference for all purposes.

BACKGROUND OF THE INVENTION

Femtosecond optical frequency combs have led to a revolution in optical metrology, spectroscopy and frequency standards by providing a precise ruler to measure optical frequencies. An optical frequency comb consists of a mode-locked femtosecond laser that is actively stabilized to generate a stable optical pulse train. The optical spectrum of the resultant laser output consists of tens of thousands of equally spaced narrow linewidth "comb-teeth", with typical spacing between each tooth of 0.1-1 GHz. The absolute frequency and linewidth of each tooth is determined by two parameters: the laser cavity length, which determines the spacing between the teeth, and the carrier-envelope phase offset frequency ($f_{ceo}$), which determines the absolute frequency of the central comb tooth. High speed control of both of these parameters is important to reduce the linewidth of each comb tooth and minimize the error in optical frequency determination.

BRIEF DESCRIPTION OF THE DRAWINGS

Various embodiments of the invention are disclosed in the following detailed description and the accompanying drawings.

DETAILED DESCRIPTION

Figure 1:
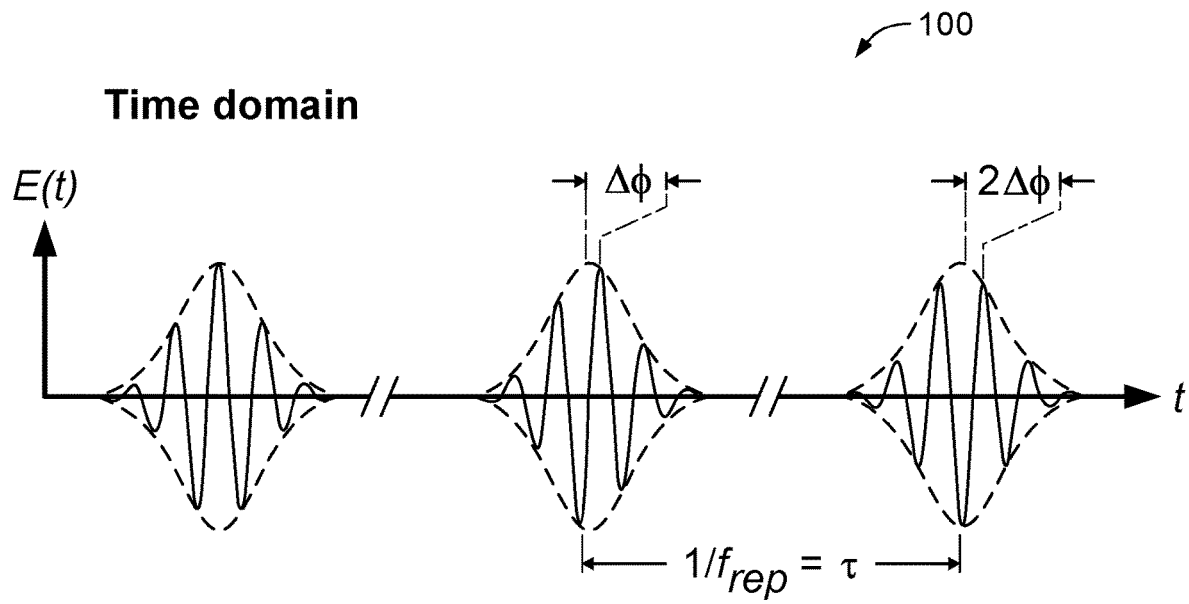
FIG. 1 is a diagram illustrating an embodiment of time and frequency domain plots for a laser frequency comb.
Figure 1:
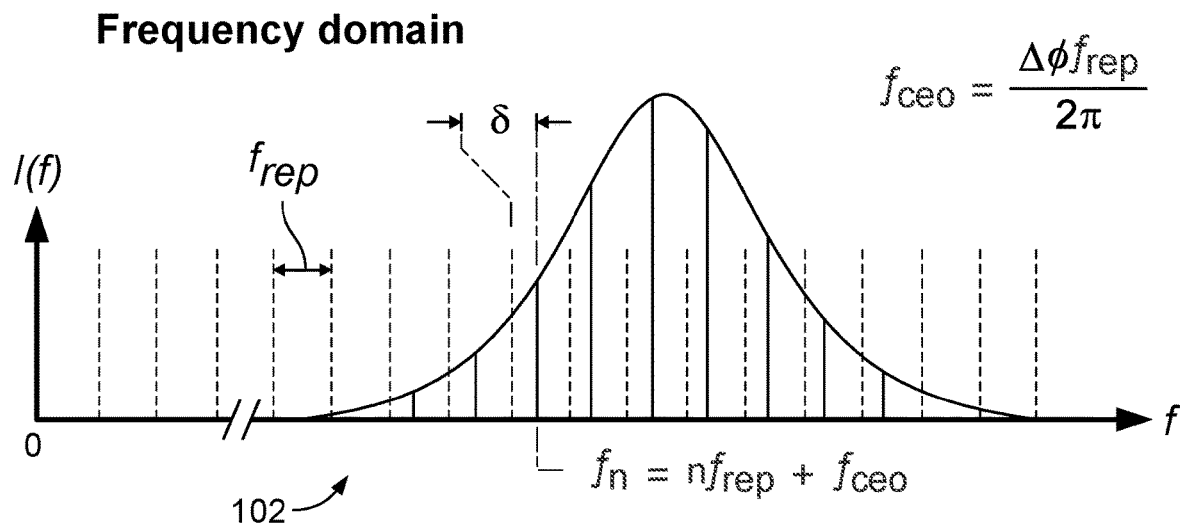

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for optical comb carrier envelope offset frequency control is disclosed. The system comprises a mode-locked oscillator, wherein the mode-locked oscillator produces an output beam using a pump beam and one or more control signals, and wherein the output beam comprises a controlled carrier envelope offset frequency; a beat note generator, wherein the beat note generator produces a beat note signal using a portion of the output beam; and a control signal generator, wherein the control signal generator produces the one or more control signals to set the beat note signal by modulating the intensity within the mode locked oscillator, and wherein modulating the intensity comprises using a Mach-Zehnder intensity modulator.

In some embodiments, a system for optical comb carrier envelope offset frequency control comprises a mode-locked oscillator comprising a fiber laser cavity and a gain modulator. The fiber laser cavity comprises a fiber-coupled loop or linear cavity including a gain medium (e.g., an erbium-doped gain medium, an ytterbium-doped gain medium) for providing optical signal gain and a mode locker for providing optical pulse shaping. The fiber-coupled loop comprises one or more couplers for coupling light into and out of the laser cavity (e.g., coupling pump laser light in and coupling the laser frequency comb light out).

In some embodiments, a system for optical comb carrier envelope offset frequency control comprises a mode-locked oscillator comprising a fiber laser cavity and a loss modulator. In some embodiments, loss modulator comprises an externally-modulated fiber-coupled optical attenuator within the laser cavity. In some embodiments, a loss modulator comprises a waveguide loss modulator. In some embodiments, a loss modulator comprises a Mach-Zehnder loss modulator. Modulation of the optical attenuation within the loss modulator modulates the laser pulse energy and therefore the carrier-envelope phase offset $f_{ceo}$.

Several other intracavity loss modulators have been demonstrated in the past. Electro-optic phase modulators, which are mainly used for cavity length control, have a smaller but finite effect on the $f_{ceo}$. In addition, electro-optic modulators in combination with an intracavity polarizer can be configured for loss modulation by modulating light polarization. Electro-optic attenuators based on graphene layers have also been used to control $f_{ceo}$.

As a comparison, the disclosed Mach Zehnder loss modulator has an advantage over intracavity electro-optic phase and polarization modulators for various reasons including that both of these modulators affect the pulse repetition frequency $f_{rep}$ via cavity length modulation, in addition to $f_{ceo}$. As a result, when used to control or stabilize $f_{ceo}$, they can induce extra noise in $f_{rep}$, which must be counteracted by an additional control element with similar actuation bandwidth. In contrast, the Mach Zehnder modulator can modulate the laser intensity without effecting the cavity length, which leads to a much simpler control system where the actuators control $f_{ceo}$ and $f_{rep}$ without any cross coupling.

As another comparison, the disclosed Mach Zehnder loss modulator has an advantage over the graphene based loss modulators for various reasons including modulator dynamic range and reliability. The amount of loss that can be induced with a graphene modulator is ~1%, which is sufficient to reduce noise in $f_{ceo}$, but not control its mean value over the entire range up to $f_{rep}/2$. In contrast, a Mach-Zehnder modulator can be used to tune the excess loss from 0 to 10 dB with a few volts of bias voltage, which results in a $f_{ceo}$ shift of $>f_{rep}$. As a result, while the Mach-Zehnder modulator can be used to control $f_{ceo}$ over the long term (e.g., more than several days), the graphene modulator requires an additional, long-throw actuator for long-term stabilization. In addition, graphene growth techniques are not very mature, which limits their commercial adoption. In contrast, waveguide based Mach-Zehnder intensity modulators are readily available in robust packages due to their ubiquitous use in the telecommunication industry.

A system for optical comb carrier envelope offset frequency control is disclosed. The system comprises a mode-locked oscillator, wherein the mode-locked oscillator produces an output beam using an input beam and one or more control signals, and wherein the output beam comprises a controlled carrier envelope offset frequency; a beat note generator, wherein the beat note generator produces a beat note signal using a portion of the output beam; and a control signal generator, wherein the control signal generator produces the one or more control signals to set the beat note signal by modulating the intensity within the mode locked oscillator, and wherein modulating the intensity comprises using an intensity modulated external laser to affect a gain medium within the mode-locked laser.

The system for optical comb carrier offset control comprises a gain modulator comprising an intensity modulated external laser coupled into the laser cavity. In some embodiments, the intensity modulated external laser comprises a continuous wave laser. In various embodiments, the intensity modulated external laser comprises a laser followed by an intensity modulator or a laser with integrated intensity modulation. The intensity modulated external laser light is at a wavelength chosen to be within the gain spectrum of the gain medium in the mode-locked laser cavity and modulates the population of the upper state in the lasing transition and hence the pulse energy. In some embodiments, increasing the power of the external laser light depletes the upper state of the gain medium and lowers the gain for the ultrashort laser frequency comb pulses, which subsequently reduces the energy of the produced pulses by the mode-locked oscillator. A change in the pulse energy leads to a differential change between the group and phase velocity within the laser cavity, which results in a change in the carrier-envelope phase offset $f_{ceo}$.

In some embodiments, the system for optical comb carrier envelope frequency control comprises a feedback loop. In some embodiments, the feedback loop comprises a beat detector for determining $f_{ceo}$ from a laser frequency comb and a control signal generator for generating one or more control signals to stabilize the $f_{ceo}$ to a desired value. In some embodiments, the control signal generator comprises a phase-locked loop. In some embodiments, the control signal generator provides control signals for modulating an intensity modulator (e.g., an intensity modulated external laser coupled into the laser cavity, a loss modulator coupled within the laser cavity).

FIG. 1 is a diagram illustrating an embodiment of time and frequency domain plots for a laser frequency comb. In the example shown, time domain plot 100 comprises a time domain plot of a laser frequency comb. The laser frequency comb comprises a set of laser pulses (e.g., laser pulses comprising an envelope shaping the amplitude of laser light). The laser pulses are spaced in time by a time $\tau=1/f_{rep}$, where $f_{rep}$ is the pulse repetition frequency. A phase shift $\Delta\phi$ is defined, wherein $\Delta\phi$ equals the carrier envelope phase shift that occurs during time (e.g., the carrier phase shift relative to a constant point within the envelope, from a first pulse to a second pulse). The phase shift $\Delta\phi$ is stable when the $f_{ceo}$ has been stabilized. Frequency domain plot 102 comprises a frequency domain plot corresponding to a frequency analysis of time domain plot 100. Frequency plot 102 comprises a plurality of frequency spikes, wherein the $n^{th}$ frequency spike is at frequency $f_n = nf_{rep} + f_{ceo}$, wherein n is an integer in the order of magnitude of millions (e.g., $10^5$, $10^6$, etc.). The carrier envelope offset frequency $f_{ceo}$ is defined as $$f_{ceo} = \frac{\Delta\phi f_{rep}}{2\pi}.$$

Note in frequency plot 102, $\delta = f_{ceo}$.

Figure 2:
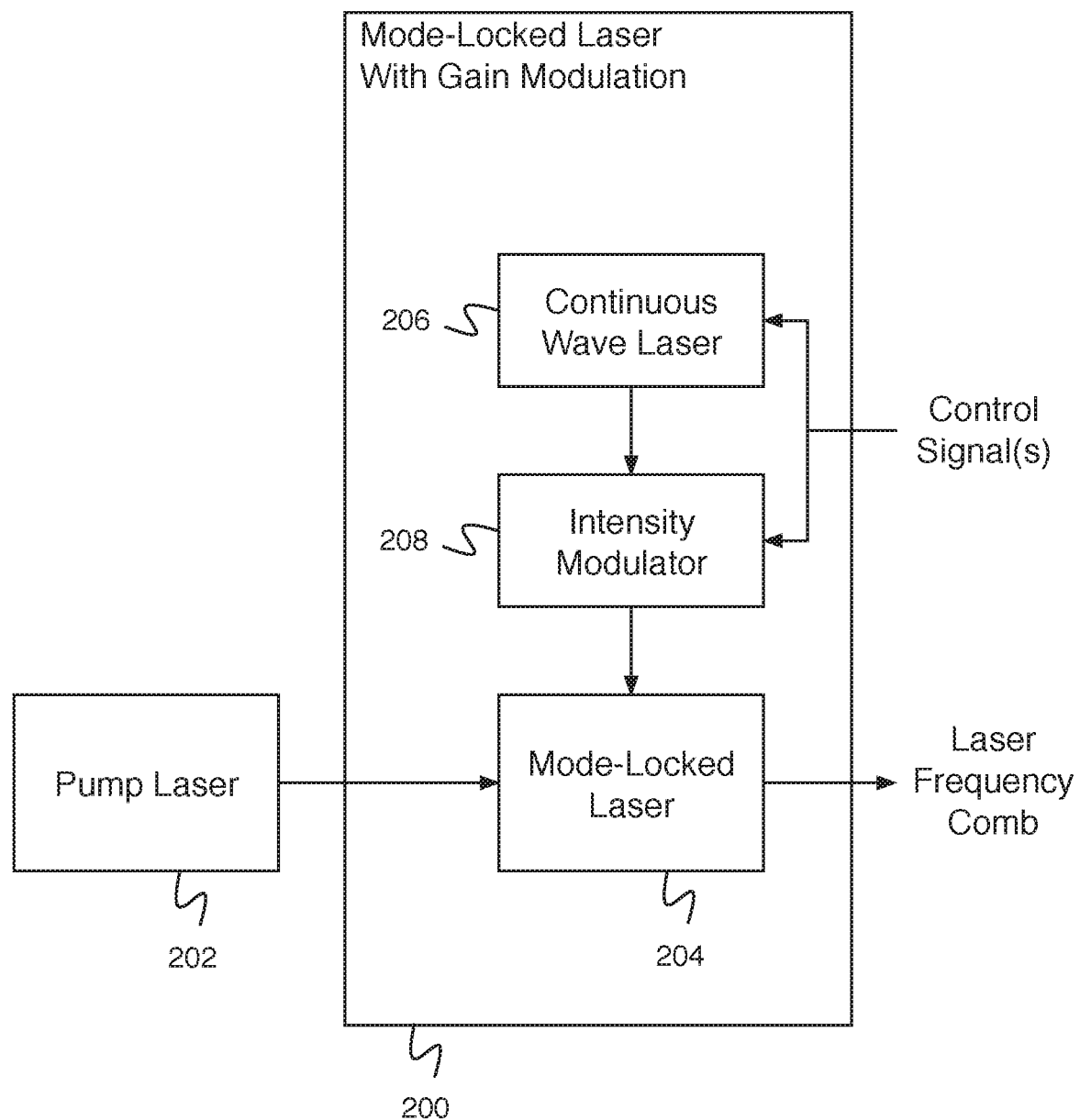
FIG. 2 is a block diagram illustrating an embodiment of a mode-locked laser with gain modulation.

FIG. 2 is a block diagram illustrating an embodiment of a mode-locked laser with gain modulation. In some embodiments, mode-locked laser with gain modulation 200 comprises a system for optical comb carrier envelope offset frequency control. In the example shown, mode-locked laser with gain modulation 200 comprises mode-locked laser 204. In some embodiments, mode-locked laser 204 comprises a fiber laser. Mode-locked laser 204 is pumped by pump laser 202. In various embodiments, pump laser 202 comprises a laser diode, a gas laser, a solid-state laser, or any other appropriate laser type. Mode-locked laser with gain modulation 200 additionally comprises continuous wave laser 206 and intensity modulator 208.

In various embodiments, continuous wave laser 206 comprises a gas laser, a solid-state laser, a semiconductor laser, a laser diode, a dye laser, or any other appropriate laser type. In various embodiments, intensity modulator 208 comprises a laser power attenuator, a laser power amplifier, an acousto-optic modulator, an electro-absorptive modulator, an electro-optic Mach-Zehnder intensity modulator, or any other appropriate intensity modulator. In some embodiments, continuous wave laser 206 and intensity modulator 208 are integrated to form an intensity modulated continuous wave laser (e.g., a diode laser with an integrated modulator, a diode laser with distributed feedback, a distributed Bragg reflector laser, etc.). Continuous wave laser 206 and/or intensity modulator 208 are controlled by one or more control signals. In embodiments, intensity modulated continuous wave laser light couples into a laser cavity of mode-locked laser 204. In some embodiments, intensity modulated continuous wave laser light affects a gain medium within the laser cavity of mode-locked laser 204.

Figure 3:
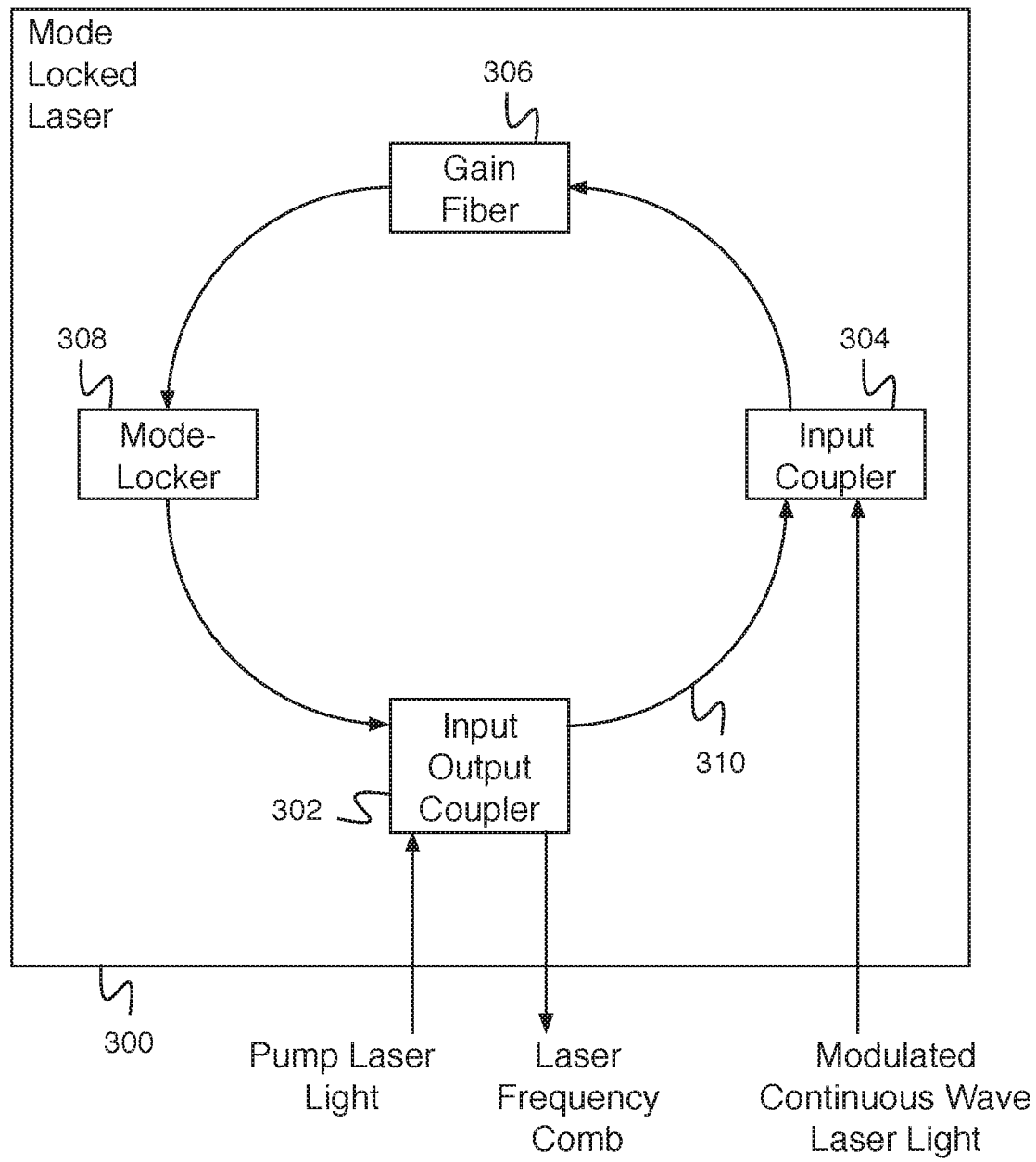
FIG. 3 is a block diagram illustrating an embodiment of a mode-locked laser.

FIG. 3 is a block diagram illustrating an embodiment of a mode-locked laser. In some embodiments, mode-locked laser 300 comprises mode-locked laser 204 of FIG. 2. In the example shown, mode-locked laser 300 comprises a fiber laser. In some embodiments, mode-locked laser with loss modulation 300 comprises a ring laser cavity. Mode-locked laser 300 comprises a set of elements coupled into a loop using optical fibers (e.g., optical fiber 310). Input output coupler 302 comprises an input output coupler for coupling input light (e.g., pump laser light, e.g., from pump laser 202 of FIG. 2) into the fiber loop and for coupling output light (e.g., the output laser frequency comb) out from the fiber loop. In some embodiments, input output coupler 302 comprises a beam splitter (e.g., using a wavelength division multiplexer (WDM) tap isolator, a circulator, etc.). Gain fiber 306 comprises a gain medium for providing optical signal gain. In some embodiments, gain fiber 306 comprises a rare-earth element doped gain medium (e.g., an erbium-doped gain medium, an ytterbium-doped gain medium, an erbium-ytterbium co-doped gain medium, etc.). Mode-locker 308 comprises a mode-locker for shaping an optical pulse. In various embodiments, mode-locker 308 comprises a passive mode-locker, a saturable absorber, a saturable absorber mirror, a semiconductor saturable absorber mirror (SESAM), a nonlinear loop mirror, Kerr lensing, nonlinear polarization rotation, or any other appropriate mode-locker. Input coupler 304 comprises an input coupler for coupling modulated continuous wave laser light into the fiber laser prior to the gain fiber. In some embodiments, input coupler 304 comprises an optical circulator. In some embodiments, the input coupler 304 is an optical circulator external to the laser cavity. It precedes the frequency comb output coupler 302 that allows the modulated continuous wave laser to travel backwards into the mode-lock laser cavity through the frequency comb output coupler 302. In some embodiments, modulated continuous wave laser light comprises modulated light from a continuous wave laser (e.g., continuous wave laser 206 of FIG. 2). In some embodiments, modulated continuous wave laser light affects gain fiber 306 (e.g., modulated continuous wave laser light depletes excited states of the gain medium).

Figure 8:
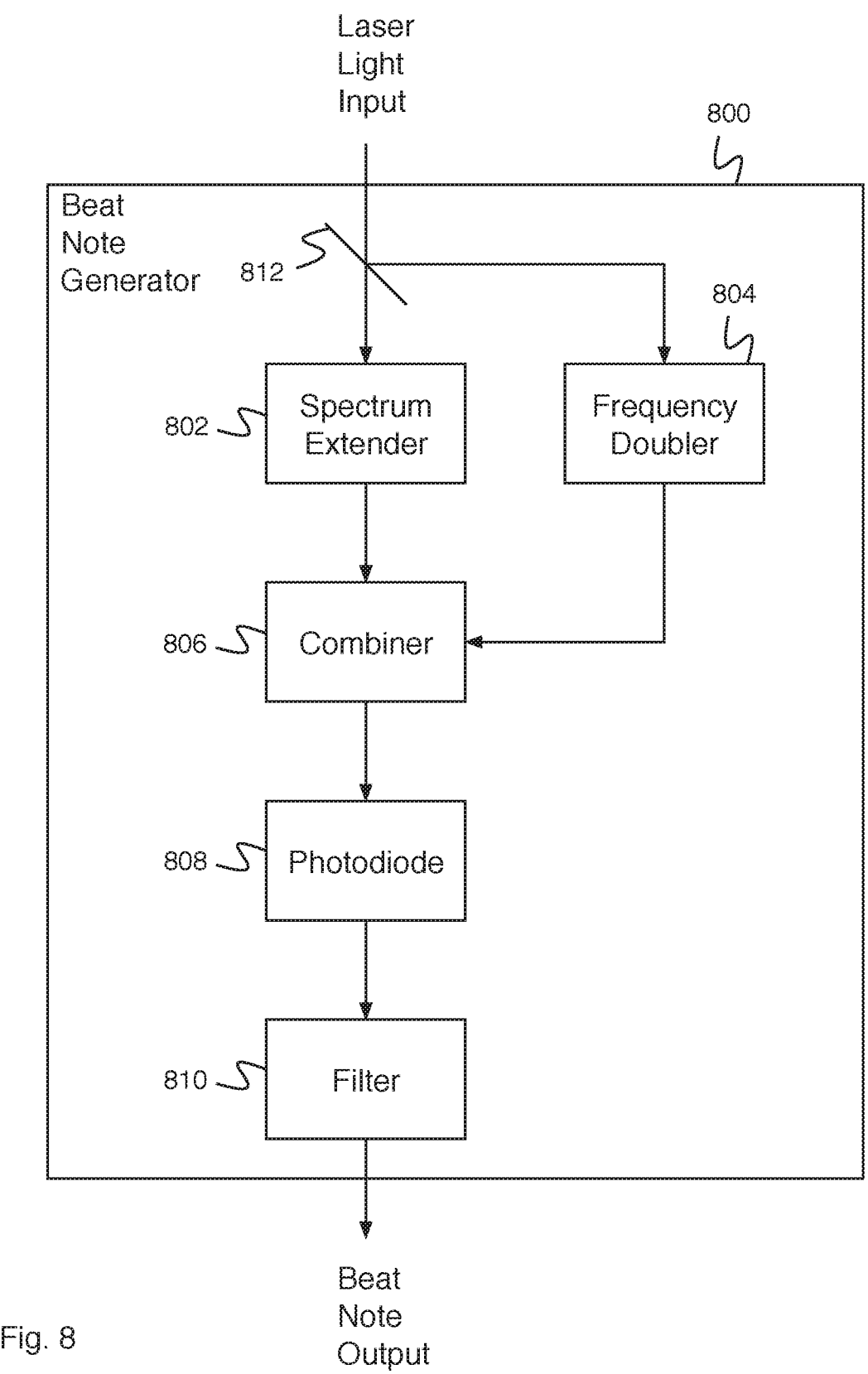
FIG. 8 is a block diagram illustrating an embodiment of a beat note generator.

In various embodiments, mode-locked laser 300 is implemented using a laser cavity configuration other than a ring cavity as shown in FIG. 3—for example, a linear cavity, a figure 8 cavity, a sigma cavity, etc.

Figure 4:
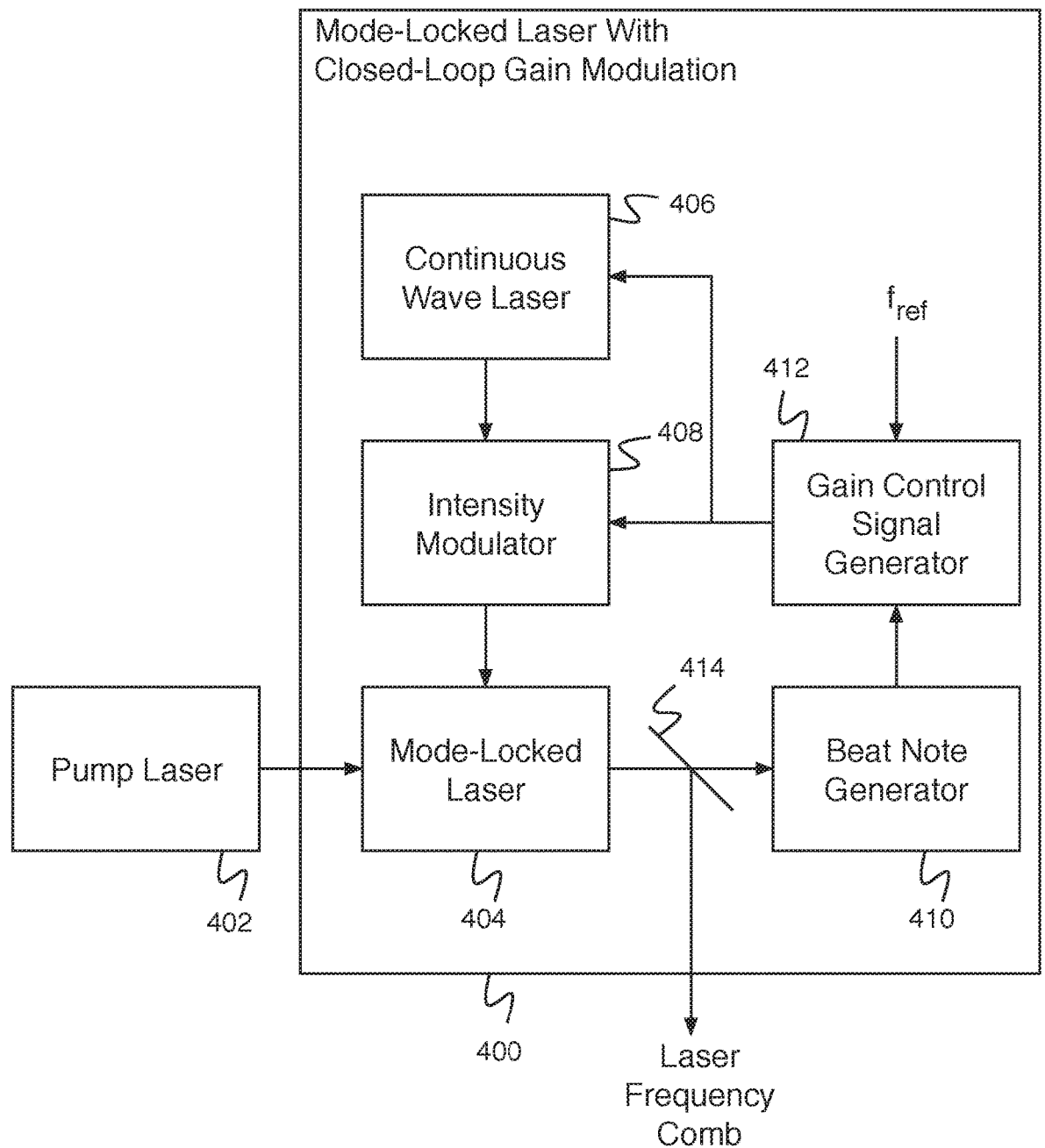
FIG. 4 is a block diagram illustrating an embodiment of a mode-locked laser with closed-loop gain modulation.

FIG. 4 is a block diagram illustrating an embodiment of a mode-locked laser with closed-loop gain modulation. In some embodiments, mode-locked laser with closed-loop gain modulation 400 comprises mode-locked laser with gain modulation 200 of FIG. 2 additionally comprising a feedback loop. In some embodiments, mode-locked laser with closed loop gain modulation 400 comprises a system for optical comb carrier envelope offset frequency control. In the example shown, mode-locked laser with closed-loop gain modulation 400 comprises mode-locked laser 404. Mode-locked laser 404 is pumped by pump laser 402. Mode-locked laser with gain modulation 200 additionally comprises continuous wave laser 406 and intensity modulator 408. In the example shown, intensity modulator 408 comprises an intensity modulator external to the laser cavity. In some embodiments, continuous wave laser 406 and intensity modulator 408 are integrated to form an intensity modulated continuous wave laser. Continuous wave laser 406 and/or intensity modulator 408 are controlled by one or more control signals. In some embodiments, intensity modulated continuous wave laser light couples into a laser cavity of mode-locked laser 404. In some embodiments, intensity modulated continuous wave laser light affects a gain medium within the laser cavity of mode-locked laser 404. In various embodiments, continuous wave laser 406 is one of the followings: a pulse laser, an LED, a part of the laser frequency comb, or any other appropriate source.

In some embodiments, the laser frequency comb output by frequency shifter 404 is split by beam splitter 414. A portion of the light is output as the mode-locked laser frequency comb output with closed-loop gain modulation, and a portion of the light is provided to beat note generator 410 for creation of a feedback control signal. In various embodiments, half of the light is output and half is fed back, 75% is output and 25% is fed back, 90% is output and 10% is fed back, 99% is output and 1% is fed back, or the light is split in any other appropriate way. Beat note generator 410 comprises a beat note generator for extracting a carrier envelope offset frequency from a laser frequency comb. In some embodiments, beat note generator 410 extracts a carrier envelope offset frequency from a laser frequency comb by comparing the laser frequency comb with a frequency doubled version of itself. In some embodiments, the light from the original laser frequency comb and a frequency doubled version of itself are combined using a beam splitter combiner. In some embodiments, the combiner comprises guiding the combined light onto the same spot on a photodiode. The photodiode converts the optical intensity beatnote into an electrical signal at the carrier envelope offset frequency. The carrier envelope offset frequency is provided to gain control signal generator 412. Gain control signal generator 412 receives the carrier envelope offset frequency and a reference frequency comprising the desired carrier envelope offset frequency and generates a control signal for providing to continuous wave laser 406 and/or intensity modulator 408 in order to stabilize the carrier envelope offset frequency to a controlled carrier envelope offset frequency. In some embodiments, the control signal generator 412 comprises a phase-locked loop. A phase error detector is used to produce an output signal related to the phase difference between the input signals. A filter is used to filter the phase error detector output. In some embodiments, the filter comprises a filter for stabilizing a control loop. In some embodiments, the filter comprises a servo control filter that includes gain. In some embodiments, gain control signal generator 412 creates more than one control signal (e.g., two control signals, three control signals, etc.). In some embodiments, gain control signal generator 412 additionally produces a control signal for controlling pump laser 402 for mode locked laser 404. Since the carrier envelope frequency is controlled via depletion of the upper-state population in the gain medium, the actuation bandwidth is limited by the upper-state lifetime. In some embodiments, where an erbium fiber mode-locked laser is used, the bandwidth can be limited by a 10-30 kHz pole in the transfer function depending on the laser parameters. In order to combat the roll-off in the actuator, the transfer function of the servo loop filter is constructed with several lead stages (derivative paths) in order to extend the gain and phase margin of the control loop. In some embodiments, the zero of the first lead stage is chosen at the same frequency as the pole in the gain modulation transfer function, while the frequency of the pole of the second lead stage is chosen an order of magnitude larger in frequency. As a result, the bandwidth of the control loop can be extended to in excess of 500 kHz.

Figure 5:
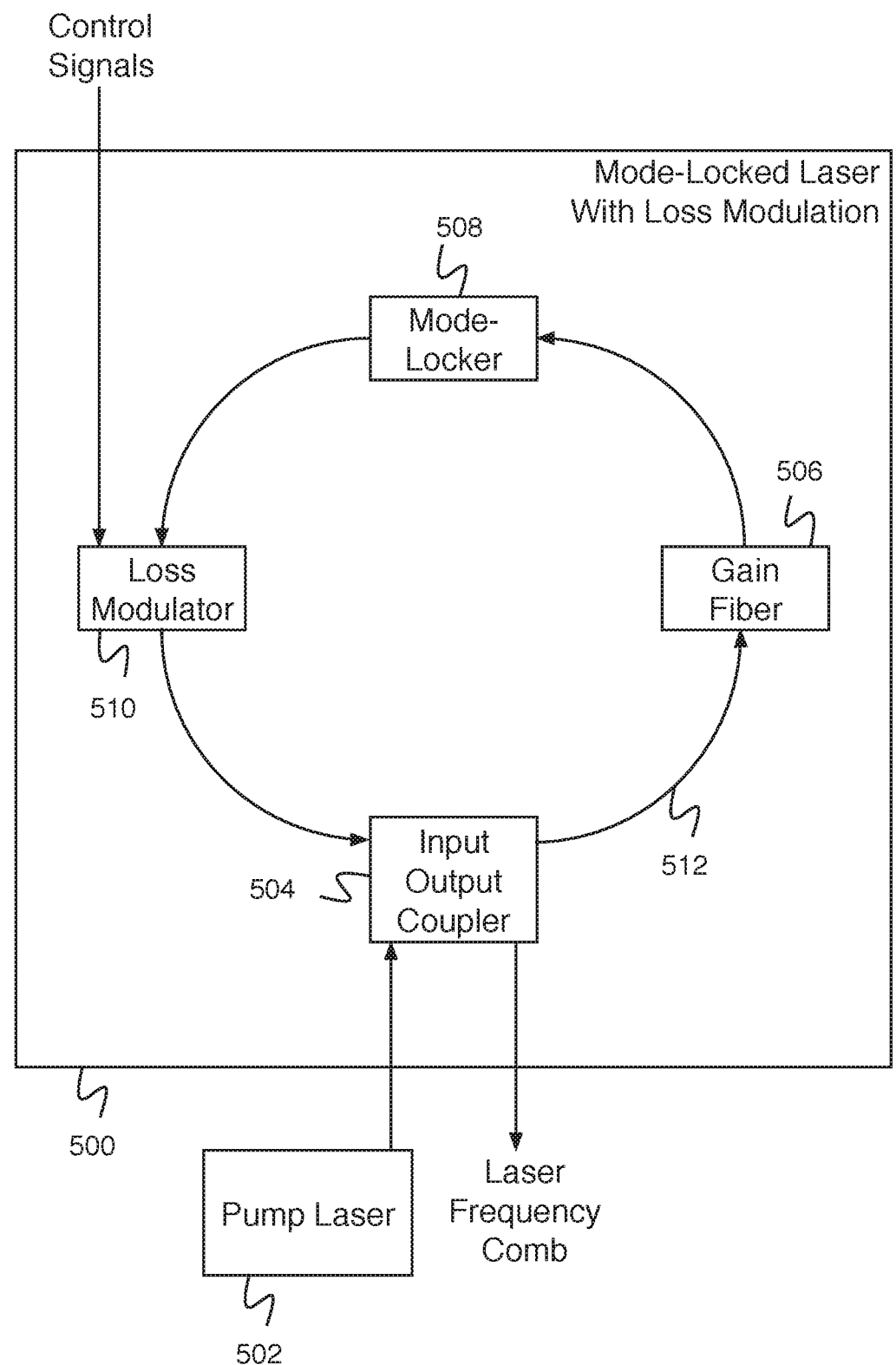
FIG. 5 is a block diagram illustrating an embodiment of a mode-locked laser with loss modulation.

FIG. 5 is a block diagram illustrating an embodiment of a mode-locked laser with loss modulation. In some embodiments, mode-locked laser 500 comprises mode-locked laser 204 of FIG. 2. In some embodiments, mode-locked laser with loss modulation 500 comprises a system for optical comb carrier envelope offset frequency control. In the example shown, mode-locked laser with loss modulation 500 comprises a fiber laser. In some embodiments, mode-locked laser with loss modulation 500 comprises a ring laser cavity. Mode-locked laser with loss modulation 500 comprises a set of elements coupled into a loop using optical fibers (e.g., optical fiber 512). Input output coupler 504 comprises an input output coupler for coupling input light (e.g., pump laser light from pump laser 502) into the fiber loop and for coupling output light (e.g., the output laser frequency comb) out from the fiber loop. In some embodiments, input output coupler 504 comprises a beam splitter (e.g., using a wavelength division multiplexer (WDM) tap isolator, a circulator, etc.). Gain fiber 506 comprises a gain fiber for providing optical signal gain. In some embodiments, gain fiber 506 comprises a rare-earth element (e.g., erbium, ytterbium, thulium, etc.) doped fiber. Mode-locker 508 comprises a mode-locker for shaping an optical pulse. In various embodiments, mode-locker 508 comprises a passive mode-locker, a saturable absorber, a saturable absorber mirror, a semiconductor saturable absorber mirror (SESAM), a nonlinear loop mirror, Kerr lensing, nonlinear polarization rotation, or any other appropriate mode-locker. Loss modulator 510 comprises a loss modulator for modulating a laser pulse. In some embodiments, loss modulator 510 comprises a controllable optical attenuator. In some embodiments, loss modulator 510 comprises a Mach-Zehnder intensity modulator.

In various embodiments, mode-locked laser with modulation 500 is implemented using a laser cavity configuration other than a ring cavity as shown in FIG. 5—for example, a linear cavity, a figure 8 cavity, a sigma cavity, etc.

Figure 6:
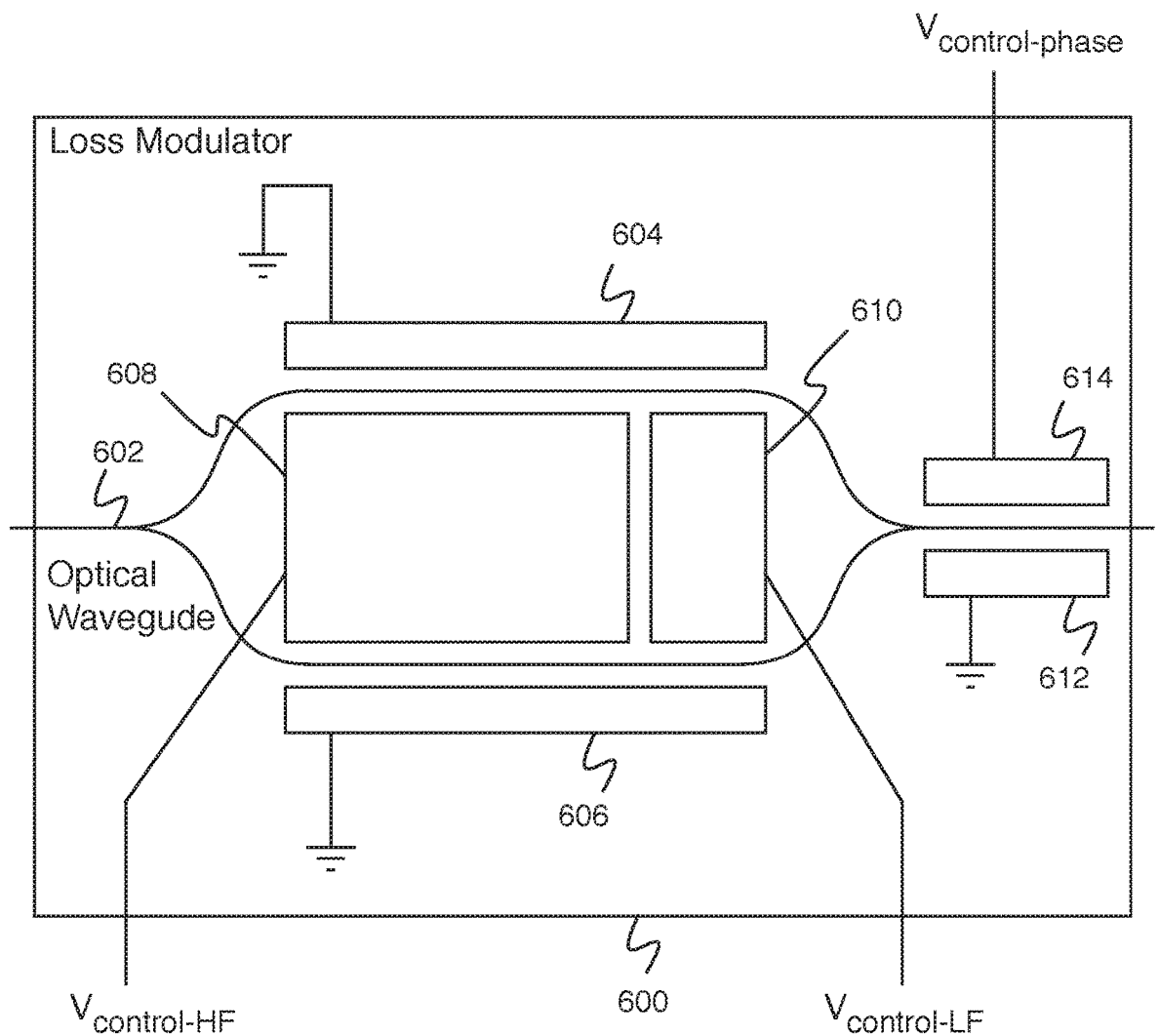
FIG. 6 is a block diagram illustrating an embodiment of a loss modulator.

FIG. 6 is a block diagram illustrating an embodiment of a loss modulator. In some embodiments, loss modulator 600 comprises loss modulator 510 of FIG. 5. In some embodiments, loss modulator 600 comprises a Mach-Zehnder intensity modulator. In some embodiments, loss modulator 600 comprises a fiber-coupled waveguide modulator. In some embodiments, loss modulator 600 comprises a dual-drive intensity modulator (e.g. z-cut $LiNbO_3$ crystal with independent drive for each waveguide, etc.); in this case, to make the device be zero-chirp, two signals that are out of phase must be fed to each drive. In some embodiments, loss modulator 600 comprises a zero-chirp modulator (e.g., a $LiNbO_3$ crystal with push-pull electrodes, a cross-cut $LiNbO_3$ crystal, etc.). In the example shown, light enters optical waveguide 602, splits to follow an upper path and a lower path, and recombines on an exit path to exit the waveguide. Electrode 604 and electrode 606 are held at ground potential, and control voltages are applied to electrode 608 and electrode 610. Electrode 608 comprises a high frequency response control voltage (e.g., a fast modulation control signal) and electrode 610 comprises a low frequency response control voltage (e.g., a slow control signal for an intensity set point, wherein the intensity set point controls a mean value of the controlled carrier envelope offset frequency, as well as the sensitivity of the modulator (% loss per volt)) A control signal applied to electrode 608 or electrode 610 causes a differential phase shift between the upper path and the lower path, causing destructive interference when the paths recombine. At the exit path, electrode 612 is held at ground potential and a phase control voltage is applied to electrode 614. In some embodiments, electrode 614 and electrode 612 comprise an integrated waveguide phase modulator to control laser cavity length. In some embodiments, loss modulator 600 does not include electrode 612 and electrode 614.

In some embodiments, loss modulator 600 comprises one set of electrodes (for example, electrode 608 and electrode 610 are combined into a single electrode). The one set of electrodes comprises a high frequency response control voltage and a low frequency response control voltage (e.g., a fast modulation control signal and a slow control signal for an intensity set point that are electrically combined). In some embodiments, a fast modulation control signal and a slow control signal are electrically combined using a bias tree and/or a summing amplifier.

Figure 7:
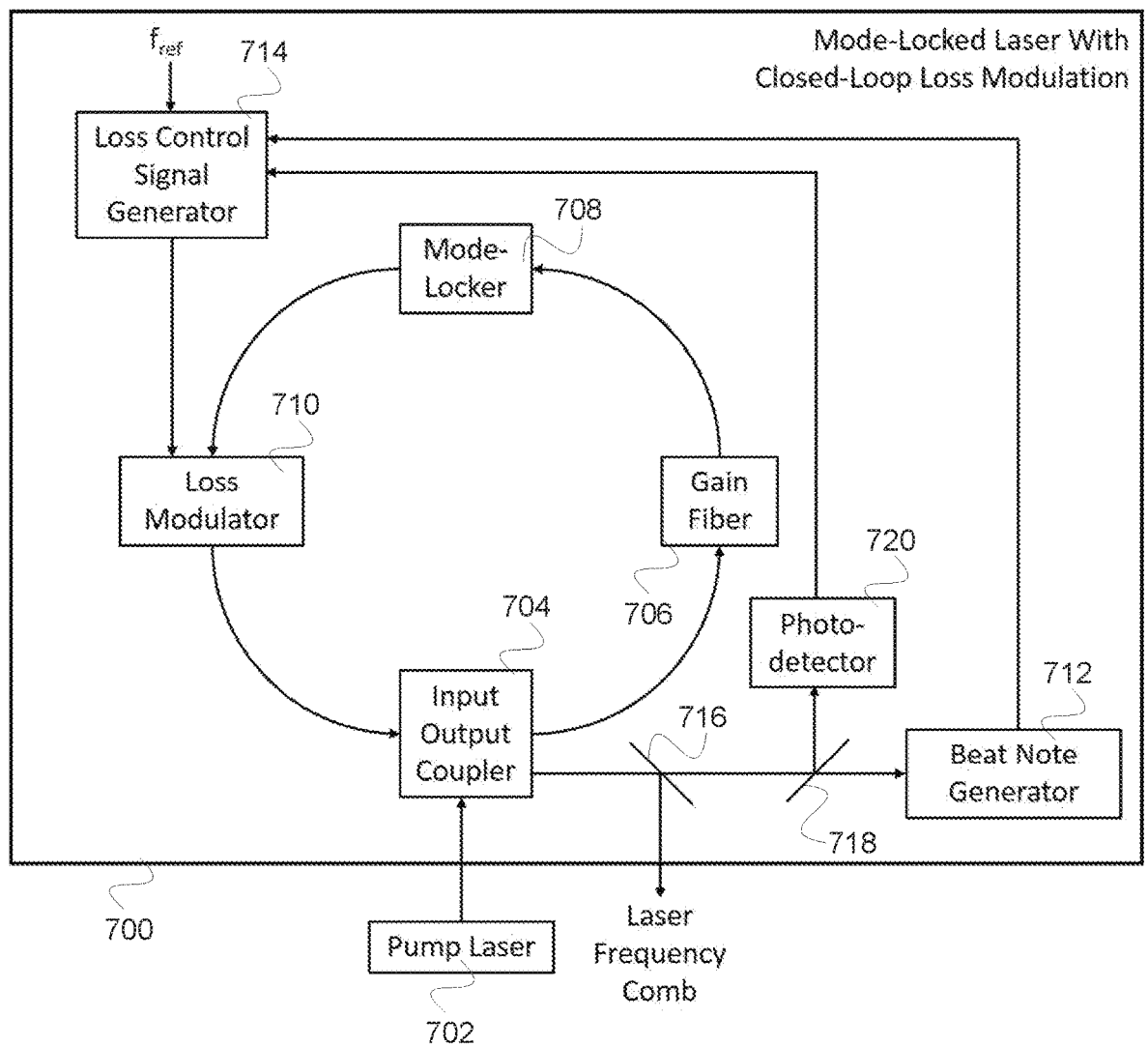
FIG. 7 is a block diagram illustrating an embodiment of a mode-locked laser with closed-loop loss modulation.

FIG. 7 is a block diagram illustrating an embodiment of a mode-locked laser with closed-loop loss modulation. In some embodiments, mode-locked laser with closed-loop loss modulation 700 comprises mode-locked laser with loss modulation 500 of FIG. 5 additionally comprising a feedback loop. In some embodiments, mode-locked laser with closed loop loss modulation 700 comprises a system for optical comb carrier envelope offset frequency control. In the example shown, mode-locked laser with closed-loop loss modulation 700 comprises a fiber laser. Mode-locked laser with closed-loop loss modulation 700 comprises a set of elements coupled into a loop using optical fibers (e.g., optical fiber 718). Input output coupler 704 comprises an input output coupler for coupling input light (e.g., pump laser light from pump laser 702) into the fiber loop and for coupling output light (e.g., the output laser frequency comb) out from the fiber loop. In some embodiments, input output coupler 704 comprises a beam splitter (e.g., using a wavelength division multiplexer (WDM) tap isolator, a circulator, etc.). Gain fiber 706 comprises a gain fiber for providing optical signal gain. Mode-locker 708 comprises a mode-locker for shaping an optical pulse. Loss modulator 710 comprises a loss modulator for modulating a laser pulse. In some embodiments, loss modulator 710 comprises a Mach-Zehnder intensity modulator. In some embodiments, photodetector 720 located after beamsplitter 718 is used to measure the mode-locked laser output intensity.

In some embodiments, mode-locked laser is implemented using a laser cavity configuration other than the ring cavity of shown in FIG. 7—for example, a linear cavity, a figure 8 cavity, a sigma cavity, etc.

In some embodiments, the laser frequency comb output from input output coupler 704 is split by beam splitter 716. A portion of the light is output as the mode-locked laser frequency comb output with closed-loop loss modulation, and a portion of the light is provided to beat note generator 712 for creation of a feedback control signal. In various embodiments, half of the light is output and half is fed back, 75% is output and 25% is fed back, 90% is output and 10% is fed back, 99% is output and 1% is fed back, or the light is split in any other appropriate way. Beat note generator 712 comprises a beat note generator for extracting a carrier envelope offset frequency from a laser frequency comb. In some embodiments, beat note generator 712 extracts a carrier envelope offset frequency from a laser frequency comb by comparing the laser frequency comb with a frequency doubled version of itself. The carrier envelope offset frequency is provided to loss control signal generator 714. In some embodiments, the laser intensity measured by photodetector 720 is also provided to loss control signal generator 714. Loss control signal generator 714 receives the carrier envelope offset frequency and a reference frequency comprising the desired carrier envelope offset frequency and generates a control signal for providing to loss modulator 710 in order to stabilize the carrier envelope offset frequency to a controlled carrier envelope offset frequency. In some embodiments, loss control signal generator 714 creates more than one control signal (e.g., two control signals, three control signals, etc.). In some embodiments, the control signal of the electrodes 610 is a low-pass filtered version of the control signal applied to electrodes 608. In some embodiments, loss control signal generator 714 is used in a phase-locked loop. In some embodiments, loss control signal generator 714 additionally produces a control signal for controlling pump laser 702 for mode locked laser with closed-loop loss modulation 700.

FIG. 8 is a block diagram illustrating an embodiment of a beat note generator. In some embodiments, beat note generator 800 comprises beat note generator 712 of FIG. 7. In the example shown, incoming laser light received by beat note generator 800 is split by beam splitter 812. A portion of the incoming light is received by spectrum extender 802 and a portion of the incoming light is received by frequency doubler 804. Spectrum extender 802 comprises a spectrum extending optical element (e.g., a nonlinear fiber, a photonic crystal fiber) for increasing the light intensity at higher frequencies. In some embodiments, the laser light intensity at higher frequencies is already high enough and spectrum extender 802 is not used. Frequency doubler 804 comprises a frequency doubler (e.g., a frequency doubling crystal) for doubling the light frequency (e.g., without changing the envelope frequency, thus doubling the carrier envelope offset frequency). Light from spectrum extender 802 and frequency doubler 804 is combined using combiner 806. In some embodiments, combiner 806 comprises a beam splitter combiner. In some embodiments, combiner 806 comprises guiding light from spectrum extender 802 and frequency doubler 804 onto the same spot on photodiode 808. Photodiode 808 comprises a photodiode for converting a light intensity into an electrical signal. In some embodiments, when light from spectrum extender 802 and frequency doubler 804 is combined, the lowest frequency component comprises a beat note at the carrier envelope offset frequency. Higher frequency components are removed by filter 810 and a beat note output is created comprising the carrier envelope offset frequency. In some embodiments, the beat note generator generates the beat note by determining a frequency difference between a spectrum extended version of the frequency shifted laser output and a frequency doubled version of the frequency shifted laser output. In some embodiments, the beat note generator generates the beat note by determining a frequency difference between the frequency shifted laser output and a frequency doubled version of the frequency shifted laser output.

Figure 9:
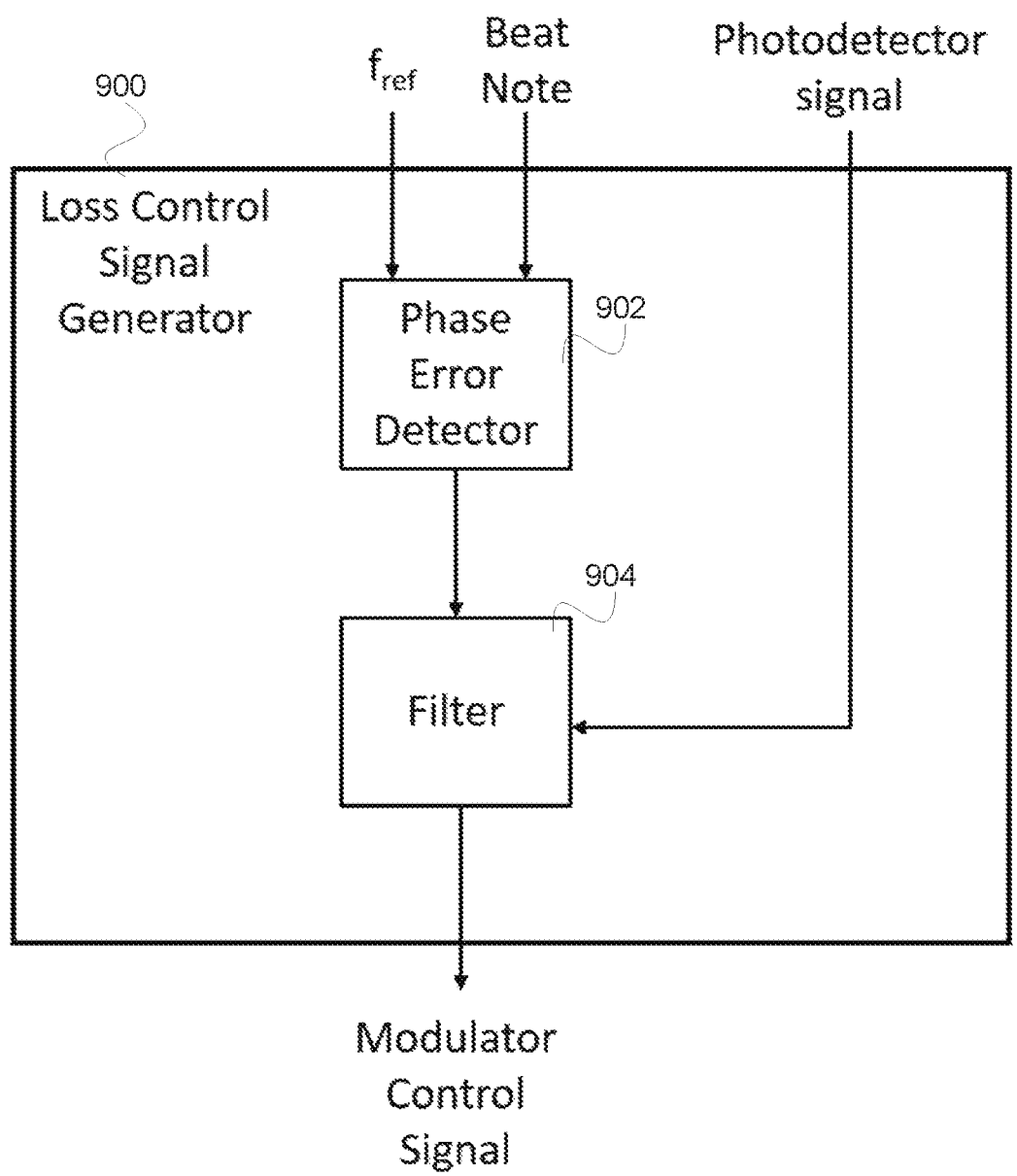
FIG. 9 is a block diagram illustrating an embodiment of a control signal generator.

FIG. 9 is a block diagram illustrating an embodiment of a control signal generator. In various embodiments, control signal generator 900 comprises gain control signal generator 412 of FIG. 4 or loss control signal generator 714 of FIG. 7. In some embodiments, control signal generator 900 is used in a phase-locked loop. In the example shown, control signal generator 900 receives a reference frequency comprising a desired carrier envelope offset frequency and a beat note comprising a measured carrier envelope offset frequency. Phase error detector 902 comprises a phase error detector for producing an output signal related to the phase difference between the input signals. In some embodiments, phase error detector 902 comprises a phase/frequency error detector. Filter 904 comprises a filter for filtering the phase error detector output. In some embodiments, filter 904 comprises a filter for stabilizing a control loop. In some embodiments, filter 904 comprises a servo control filter that includes gain. In some embodiments, filter 904 also receives a reference voltage from the intensity photodetector (e.g., photodetector 720 of FIG. 7). Filter 904 produces one or more signals for controlling a modulator (e.g., intensity modulator 408 of FIG. 4, loss modulator 710 of FIG. 7) or a pump laser (e.g., pump laser 402 of FIG. 4 or pump laser 702 of FIG. 7). In the example shown, control signal generator 900 of FIG. 9 produces a DC (e.g., direct current) control signal.

Figure 10:
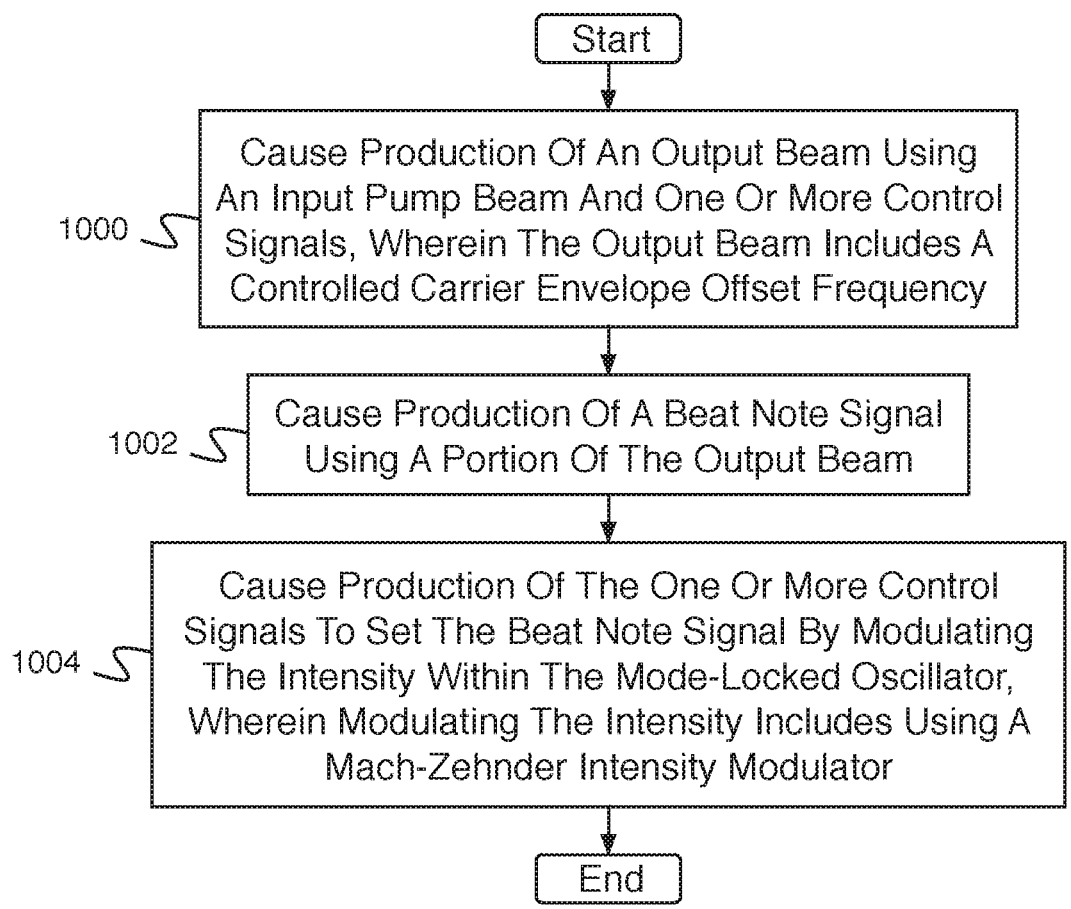
FIG. 10 is a flow diagram illustrating an embodiment of a process for optical comb carrier envelope offset frequency control.

FIG. 10 is a flow diagram illustrating an embodiment of a process for optical comb carrier envelope offset frequency control. In some embodiments, the process of FIG. 10 is executed by mode-locked laser with closed loop loss modulation 700 of FIG. 7. In the example shown, in 1000, production of an output beam is caused using an input pump beam and one or more control signals, wherein the output beam includes a controlled carrier envelope offset frequency. In 1002, production of a beat note signal using a portion of the output beam is caused. In 1004, production of the one more control signals to set the beat note signal by modulating the intensity within the mode-locked oscillator is caused, wherein modulating the intensity includes using a Mach-Zehnder intensity modulator. In some embodiments, the mode-locked laser output, the intensity modulator, the optical beat note generator, and pump laser modules are disposed so that carrier envelope offset frequency is controlled. In some embodiments, the mode-locked laser output, the intensity modulator, the optical beat note generator, and pump laser modules are fiber coupled.

Figure 11:
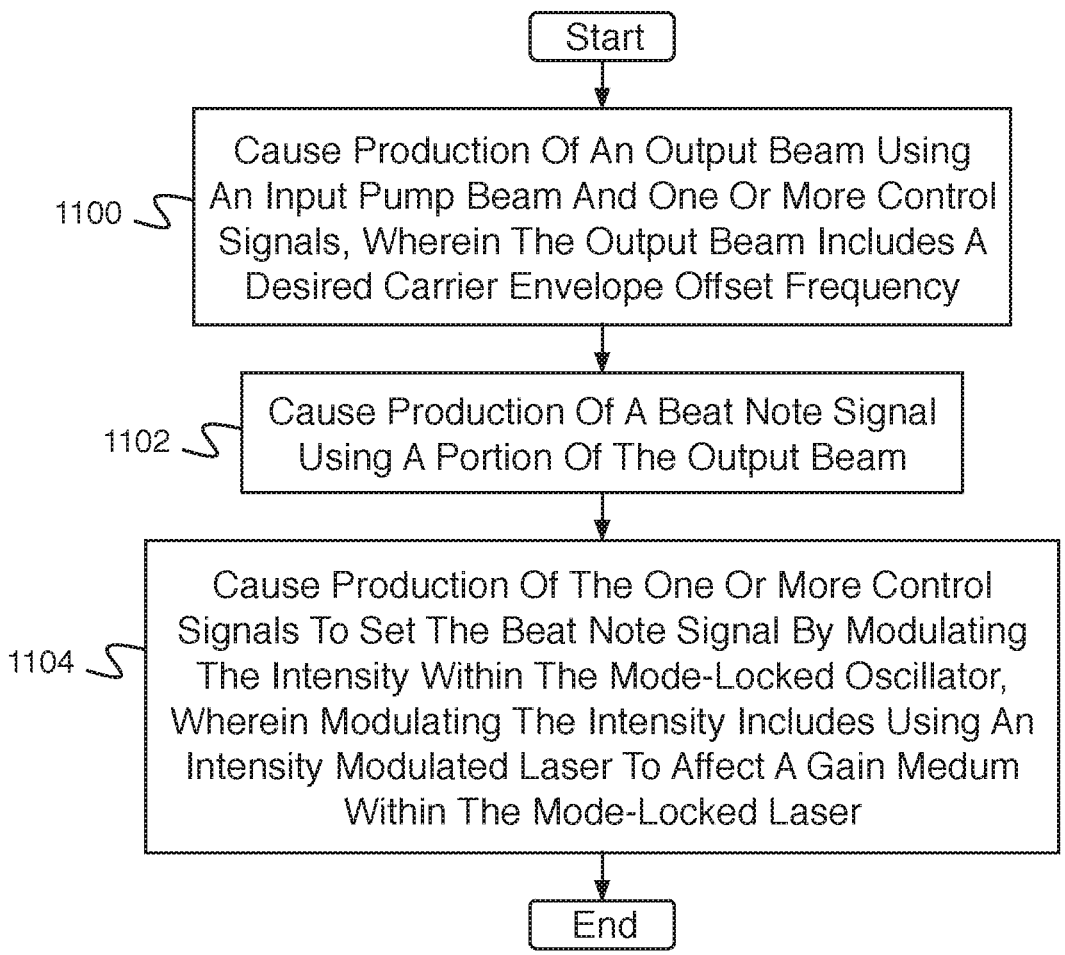
FIG. 11 is a flow diagram illustrating an embodiment of a process for optical comb carrier envelope offset frequency control.

FIG. 11 is a flow diagram illustrating an embodiment of a process for optical comb carrier envelope offset frequency control. In some embodiments, the process of FIG. 11 is executed by mode-locked laser with closed loop gain modulation 400 of FIG. 4. In the example shown, in 1100, production of an output beam is caused using an input pump beam and one or more control signals, wherein the output beam includes a controlled carrier envelope offset frequency. In 1102, production of a beat note signal using a portion of the output beam is caused. In 1104, production of the one more control signals to set the beat note signal by modulating the intensity within the mode-locked oscillator is caused, wherein modulating the intensity includes using an intensity modulated laser to affect a gain medium within the mode-locked laser. In some embodiments, the mode-locked laser output, the intensity modulator, the optical beat note generator, and pump laser modules are disposed so that carrier envelope offset frequency is controlled. In some embodiments, the mode-locked laser output, the intensity modulator, the optical beat note generator, and pump laser modules are fiber coupled.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for optical comb carrier envelope offset frequency control, comprising:
a mode-locked oscillator, wherein the mode-locked oscillator produces an output beam using only one pump beam and one or more control signals, and wherein the output beam comprises a controlled carrier envelope offset frequency, wherein the controlled carrier envelope offset frequency comprises an offset frequency from an integer times a pulse repetition frequency;

a beat note generator, wherein the beat note generator produces a beat note signal using a portion of the output beam, wherein the beat note generator extracts the carrier envelope offset frequency from a laser frequency comb; and a control signal generator, wherein the control signal generator produces the one or more control signals to set the beat note signal by modulating the oscillating electro-magnetic field intensity of the mode locked oscillator in order to control the controlled carrier envelope offset frequency, and wherein modulating the oscillating electro-magnetic field intensity of the mode locked oscillator comprises using a Mach-Zehnder intensity modulator within the mode-locked oscillator without using external optical modulation, wherein the Mach-Zehnder intensity modulator comprises a zero-chirp modulator.

2. The system of claim 1, wherein the Mach-Zehnder intensity modulator comprises a fiber-coupled waveguide modulator.

3. The system of claim 1, wherein the Mach-Zehnder intensity modulator comprises a dual drive modulator with independent electrodes for each arm of the waveguide interferometer.

4. The system of claim 1, wherein the zero-chirp modulator comprises a $LiNbO_3$ crystal with push-pull electrodes.

5. The system of claim 1, wherein the Mach-Zehnder intensity modulator is controlled using the one or more control signals.

6. The system of claim 4, wherein the Mach-Zehnder intensity modulator comprises two sets of electrodes, and wherein a first set of electrodes of the two sets of electrodes is for a fast modulation control signal and a second set of electrodes of the two sets of electrodes is for a slow control signal for an intensity set point, wherein the intensity set point controls a mean value of the controlled carrier envelope offset frequency.

7. The system of claim 4, wherein the Mach-Zehnder intensity modulator comprises one set of electrodes, wherein the one set of electrodes comprises a fast modulation control signal and a slow control signal for an intensity set point that are electrically combined.

8. The system of claim 6, wherein the fast modulation control signal and the slow control signal are electrically combined using one of the following: a bias tree, a fast summing amplifier.

9. The system of claim 1, wherein the Mach-Zehnder intensity modulator is followed by an integrated waveguide phase modulator to control laser cavity length.

10. The system of claim 1, wherein the mode-locked oscillator uses one of the following for mode locking: a saturable absorber, a saturable absorber mirror, a semiconductor saturable absorber mirror, a nonlinear loop mirror, Kerr lensing or nonlinear polarization rotation.

11. The system of claim 1, wherein the mode-locked oscillator is implemented using a ring laser cavity.

12. The system of claim 1, wherein the Mach-Zehnder intensity modulator comprises an upper path and a lower path.

13. The system of claim 12, wherein the upper path and the lower path comprise a high frequency control and a low frequency control.

14. The system of claim 1, wherein the mode-locked oscillator comprises a ring oscillator.

15. The system of claim 1, wherein the mode-locked oscillator comprises a figure 8 oscillator.

16. The system of claim 1, wherein the mode-locked oscillator comprises a sigma oscillator.

* * * * *